US012568310B2

(12) United States Patent (10) Patent No.: US 12,568,310 B2
Arisue et al. (45) Date of Patent: Mar. 3, 2026

(54) TARGET TRACKING DEVICE, TARGET TRACKING METHOD, AND RECORDING MEDIUM FOR STORING TARGET TRACKING PROGRAM

(71) Applicant: MITSUBISHI HEAVY INDUSTRIES, LTD., Tokyo (JP)

(72) Inventors: Tomoya Arisue, Tokyo (JP); Koichi Hamamoto, Tokyo (JP); Nobuhiro Sunada, Tokyo (JP); Atsushi Ochiai, Tokyo (JP); Shingo Nishikata, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 22 days.

(21) Appl. No.: 18/700,494

(22) PCT Filed: Sep. 5, 2022

(86) PCT No.: PCT/JP2022/033293
§ 371 (c)(1),
(2) Date: Apr. 11, 2024

(87) PCT Pub. No.: WO2023/062967
PCT Pub. Date: Apr. 20, 2023

(65) Prior Publication Data
US 2024/0422433 A1 Dec. 19, 2024

(30) Foreign Application Priority Data
Oct. 14, 2021 (JP) ................................. 2021-168758

(51) Int. Cl.
*H04N 23/67* (2023.01)
*G06V 10/98* (2022.01)
*H04N 23/667* (2023.01)

(52) U.S. Cl.
CPC ......... *H04N 23/671* (2023.01); *G06V 10/993* (2022.01); *H04N 23/667* (2023.01)

(58) Field of Classification Search
CPC ....... F41H 13/0062; F41H 11/02; G01S 7/495
See application file for complete search history.

(56) References Cited

U.S. PATENT DOCUMENTS 4,647,759 A 3/1987 Worsham et al.
6,977,598 B2 * 12/2005 Longbottom ............. B64F 1/36
342/36

(Continued)

FOREIGN PATENT DOCUMENTS

JP 08-271622 10/1996
JP 2008-045930 2/2008

(Continued)

OTHER PUBLICATIONS

Extended European Search Report issued Nov. 13, 2024 in corresponding European Patent Application No. 22880663.4.

(Continued)

*Primary Examiner* — Clifford Hilaire
(74) *Attorney, Agent, or Firm* — Wenderoth, Lind & Ponack, L.L.P.

(57) ABSTRACT

Provided are a target tracking device that efficiently tracks a target, a target tracking method, and a recording medium for storing a target tracking program. This target tracking device comprises a determination condition selector and a tracker. The determination condition selector selects a tracking mode for tracking a detected target from among a plurality of tracking modes on the basis of a group of determination conditions related to the position of the target. The tracker tracks the target in the selected tracking mode. The plurality of tracking modes include a first tracking mode that focuses on the vulnerable portion of the target and a second tracking mode that focuses on the center of gravity of the target. The (Continued)

151A: IMAGE

2: TARGET

21: VULNERABLE PART target tracking device further comprises a coping device that irradiates the focused portion of the target with a laser beam to cope with the target.

15 Claims, 12 Drawing Sheets

(56) References Cited

U.S. PATENT DOCUMENTS

| | | | | |
|---|---|---|---|---|
| 2001/0046309 | A1* | 11/2001 | Kamei | G06T 7/254 |
| | | | | 382/103 |
| 2006/0163446 | A1* | 7/2006 | Guyer | G02B 13/12 |
| | | | | 250/203.1 |
| 2007/0040061 | A1 | 2/2007 | Williams | |
| 2010/0282942 | A1 | 11/2010 | Moiser et al. | |
| 2014/0125964 | A1 | 5/2014 | Jonas | |
| 2017/0059282 | A1 | 3/2017 | Schlosser | |
| 2018/0080747 | A1 | 3/2018 | Nishikata et al. | |

| | | | |
|---|---|---|---|
| 2019/0063881 | A1 | 2/2019 | Abramov et al. |
| 2020/0025531 | A1 | 1/2020 | Jung et al. |
| 2020/0041234 | A1 | 2/2020 | Abramov et al. |

FOREIGN PATENT DOCUMENTS

| | | |
|---|---|---|
| JP | 2016-075614 | 5/2016 |
| JP | 2017-15311 | 1/2017 |
| JP | 2019-049371 | 3/2019 |
| JP | 2019-60589 | 4/2019 |
| JP | 2019-534441 | 11/2019 |
| JP | 2020-112366 | 7/2020 |

OTHER PUBLICATIONS

International Search Report issued Nov. 29, 2022 in International Application No. PCT/JP2022/033293, with English-language translation.
Written Opinion of the International Searching Authority issued Nov. 29, 2022 in International Application No. PCT/JP2022/033293, with English-language translation.

* cited by examiner

101: TARGET TRACKING DEVICE

162: IRRADIATION OPTICAL SYSTEM

13: RADAR DEVICE    15: CAMERA

2A: TARGET

2B: TARGET

161: LASER OSCILLATOR    11: CALCULATION DEVICE

3: GROUND SURFACE

151A: IMAGE

2: TARGET

21: VULNERABLE PART

151B: IMAGE

2: TARGET

22: CENTER-OF-GRAVITY PART

1: TARGET TRACKING DEVICE

162: IRRADIATION OPTICAL SYSTEM

13: RADAR DEVICE    15: CAMERA    2: TARGET

14: WEATHER OBSERVATION DEVICE

161: LASER OSCILLATOR    11: CALCULATION DEVICE

3: GROUND SURFACE

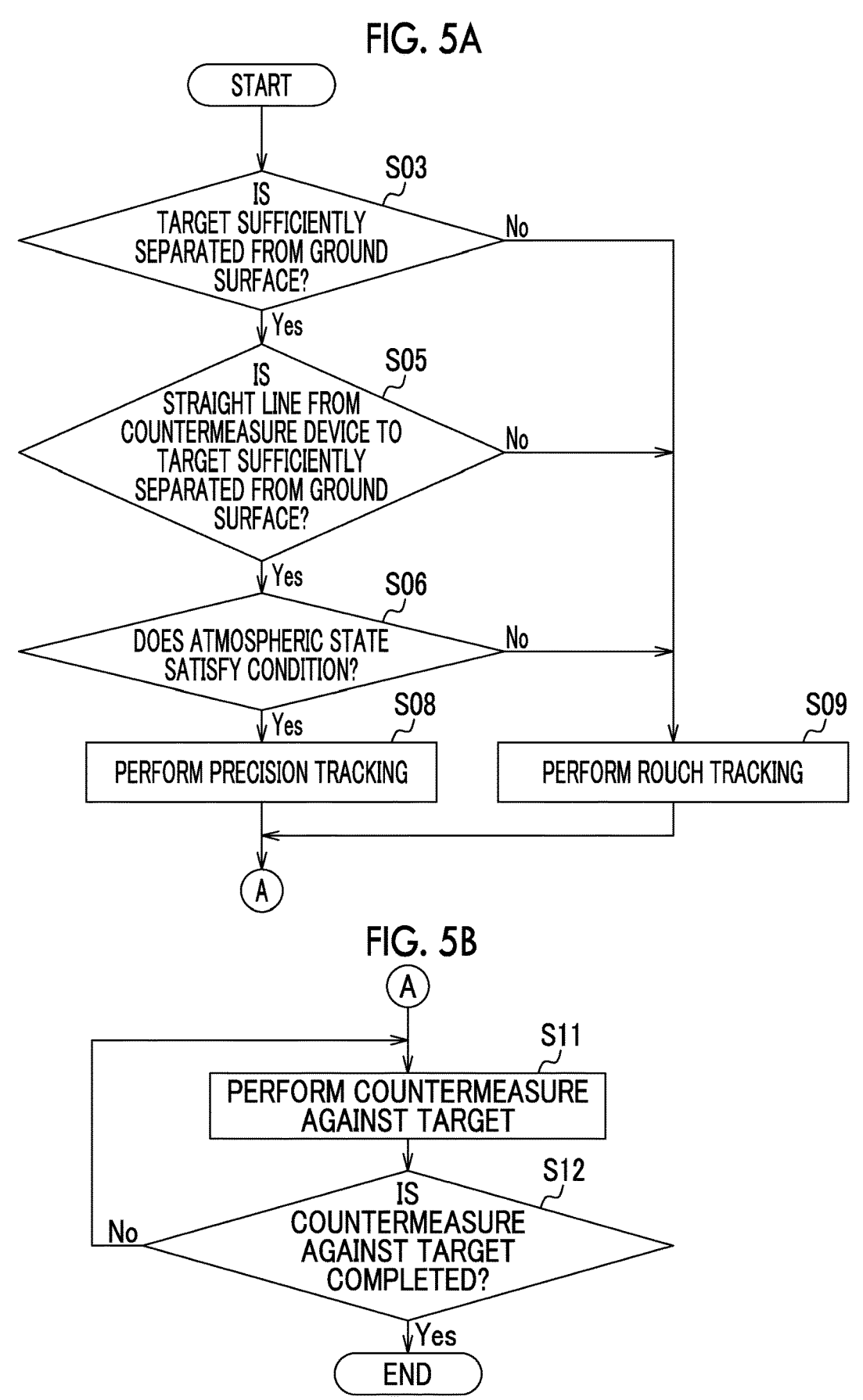

FIG. 5A

START

S03
IS
TARGET SUFFICIENTLY
SEPARATED FROM GROUND
SURFACE?

No

Yes

S05
IS
STRAIGHT LINE FROM
COUNTERMEASURE DEVICE TO
TARGET SUFFICIENTLY
SEPARATED FROM GROUND
SURFACE?

No

Yes

S06
DOES ATMOSPHERIC STATE
SATISFY CONDITION?

No

Yes

S08
PERFORM PRECISION TRACKING

S09
PERFORM ROUGH TRACKING

S11
PERFORM COUNTERMEASURE
AGAINST TARGET

S12
IS
COUNTERMEASURE
AGAINST TARGET
COMPLETED?

No

Yes

END

FIG. 6

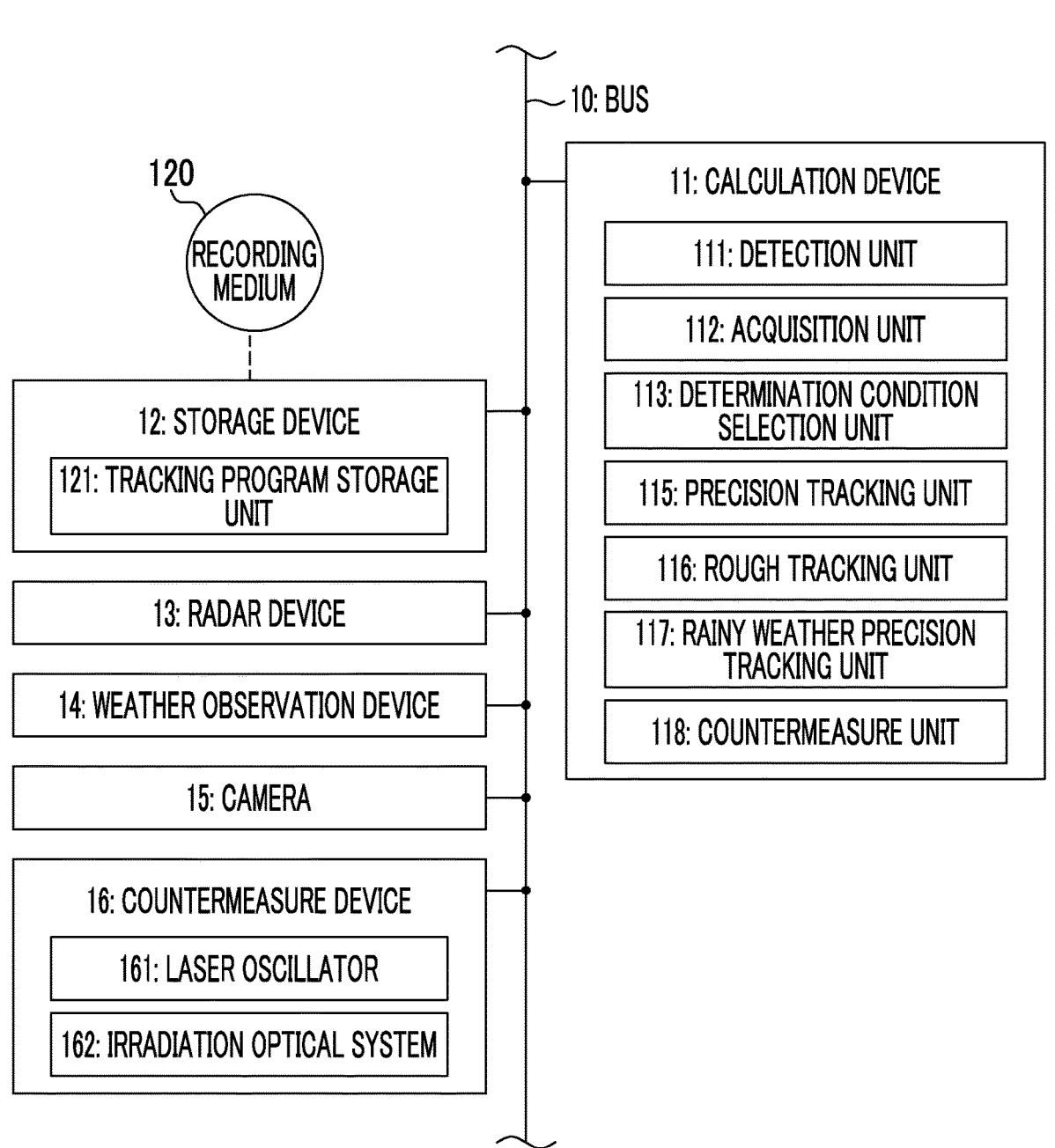

1: TARGET TRACKING DEVICE

10: BUS

120 RECORDING MEDIUM

11: CALCULATION DEVICE

111: DETECTION UNIT

112: ACQUISITION UNIT

113: DETERMINATION CONDITION SELECTION UNIT

115: PRECISION TRACKING UNIT

116: ROUGH TRACKING UNIT

117: RAINY WEATHER PRECISION TRACKING UNIT

118: COUNTERMEASURE UNIT

12: STORAGE DEVICE

121: TRACKING PROGRAM STORAGE UNIT

13: RADAR DEVICE

14: WEATHER OBSERVATION DEVICE

15: CAMERA

16: COUNTERMEASURE DEVICE

161: LASER OSCILLATOR

162: IRRADIATION OPTICAL SYSTEM

FIG. 9

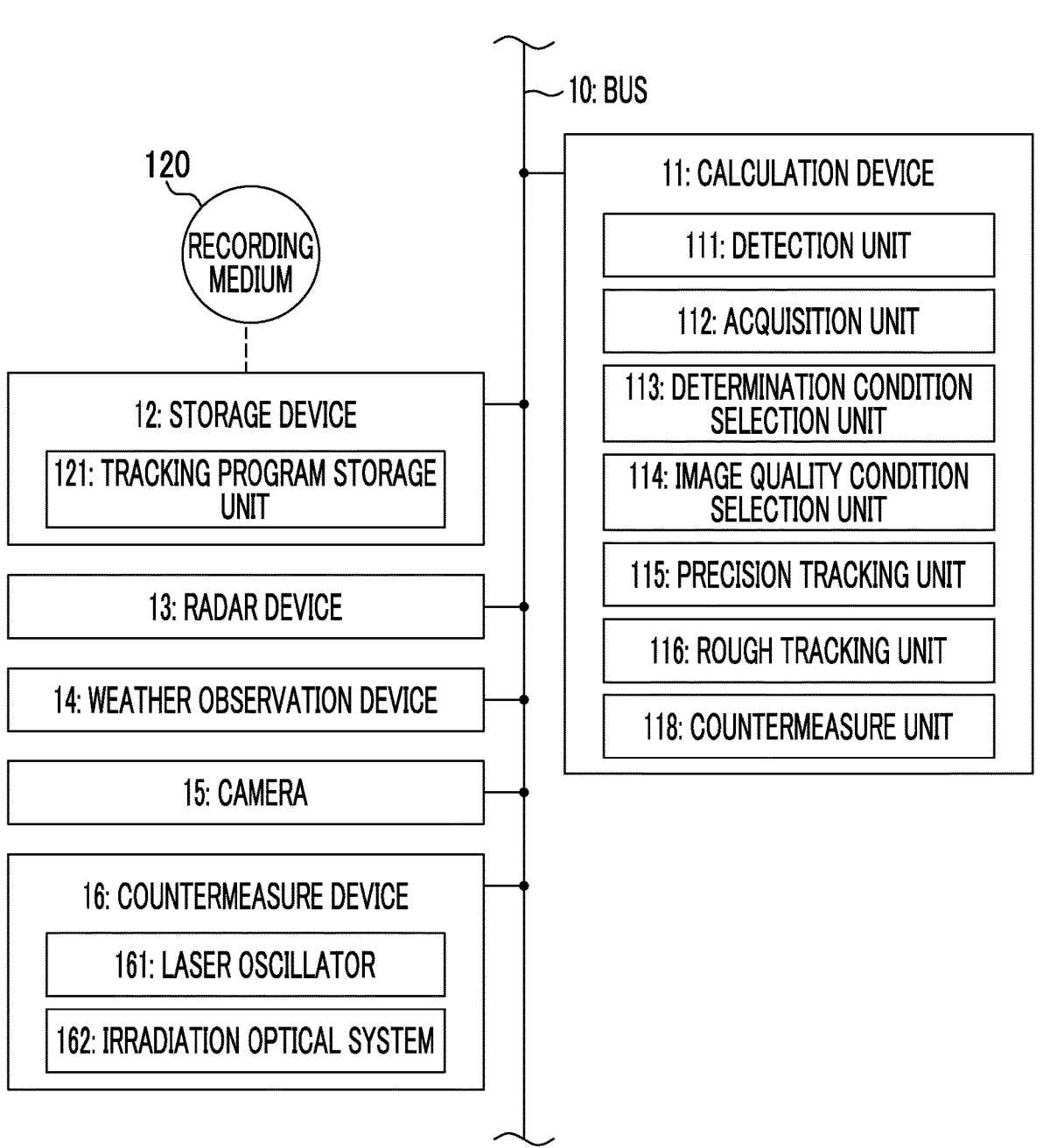

1: TARGET TRACKING DEVICE

10: BUS

120

RECORDING MEDIUM

12: STORAGE DEVICE

121: TRACKING PROGRAM STORAGE UNIT

13: RADAR DEVICE

14: WEATHER OBSERVATION DEVICE

15: CAMERA

16: COUNTERMEASURE DEVICE

161: LASER OSCILLATOR

162: IRRADIATION OPTICAL SYSTEM

11: CALCULATION DEVICE

111: DETECTION UNIT

112: ACQUISITION UNIT

113: DETERMINATION CONDITION SELECTION UNIT

114: IMAGE QUALITY CONDITION SELECTION UNIT

115: PRECISION TRACKING UNIT

116: ROUGH TRACKING UNIT

118: COUNTERMEASURE UNIT

TARGET TRACKING DEVICE, TARGET TRACKING METHOD, AND RECORDING MEDIUM FOR STORING TARGET TRACKING PROGRAM

TECHNICAL FIELD

The present invention relates to a target tracking device, a target tracking method, and a recording medium storing a target tracking program and, for example, can be suitably used for tracking a flying target.

BACKGROUND ART

In performing a countermeasure against an unmanned aerial vehicle (UAV) such as a drone using laser irradiation or the like, the countermeasure can be performed in a short time by irradiating a vulnerable part of a target. Identifying the vulnerable part of the target requires a clear image of the target. In a case where a clear image is not obtained and it is difficult to recognize the vulnerable part of the target, the laser irradiation is performed to a center-of-gravity part or the like of the target instead.

Atmospheric turbulence is one of causes of being unable to obtain a clear image of the target. In a case where a ground surface is warmed by sunlight, atmosphere near the ground surface is warmed by the ground surface, and the atmospheric turbulence may occur. In a region in which the atmospheric turbulence has occurred in the atmosphere, distributions of a temperature, an air pressure, a refractive index, and the like are not uniform. Thus, a wavefront of light passing through the region is disturbed, and an image formed by the light is also disturbed.

Whether or not the image of the target is clear enough to recognize the vulnerable part of the target can be determined using image recognition technology that uses artificial intelligence (AI). However, this processing has a relatively high computation cost and requires a relatively long processing time.

Regarding the above, PTL 1 (Japanese Unexamined Patent Application Publication No. 2019-60589) discloses an aerial defense system. The aerial defense system of PTL 1 is means for neutralizing an opponent aircraft by emitting a laser beam or the like from a target neutralization device mounted on an ally aircraft, and an effect and the like caused by the atmospheric turbulence at a low altitude are not considered in the aerial defense system.

CITATION LIST

Patent Literature

[PTL 1] Japanese Unexamined Patent Application Publication No. 2019-60589

SUMMARY OF INVENTION

In view of the above circumstances, one object of the present disclosure is to provide a target tracking device, a target tracking method, and a recording medium storing a target tracking program for efficiently tracking a target. Other objects and novel features will become apparent from description of the present specification and the accompanying drawings.

According to one embodiment, a target tracking device includes a determination condition selector and a tracker. The determination condition selector selects a tracking mode for tracking a detected target from a plurality of tracking modes based on a determination condition group for determining based on a position of the target. The tracker tracks the target in the selected tracking mode. The plurality of tracking modes include a first tracking mode for focusing on a vulnerable part of the target and a second tracking mode for focusing on a center-of-gravity part of the target. The target tracking device further includes a countermeasure device that performs a countermeasure by irradiating a focused part of the target with a laser beam.

According to one embodiment, a target tracking method includes selecting a tracking mode for tracking a detected target from a plurality of tracking modes based on a determination condition group for determining based on a position of the target, and tracking the target in the selected tracking mode. The plurality of tracking modes include a first tracking mode for focusing on a vulnerable part of the target and a second tracking mode for focusing on a center-of-gravity part of the target. The target tracking method further includes performing a countermeasure by irradiating a focused part of the target with a laser beam.

According to one embodiment, a recording medium storing a target tracking program stores a target tracking program that is executed by a calculation device to implement predetermined processing. The processing includes selecting a tracking mode for tracking a detected target from a plurality of tracking modes based on a determination condition group for determining based on a position of the target, and tracking the target in the selected tracking mode. The plurality of tracking modes include a first tracking mode for focusing on a vulnerable part of the target and a second tracking mode for focusing on a center-of-gravity part of the target. The processing further includes performing a countermeasure by irradiating a focused part of the target with a laser beam.

According to one embodiment, the target can be efficiently tracked.

BRIEF DESCRIPTION OF DRAWINGS

FIG. 5A is a part of a flowchart illustrating a configuration example of the target tracking method according to one embodiment.

FIG. 5B is a part of the flowchart illustrating the configuration example of the target tracking method according to one embodiment.

FIG. 6 is a block circuit diagram illustrating a configuration example of the target tracking device according to one embodiment.

FIG. 9 is a block circuit diagram illustrating a configuration example of the target tracking device according to one embodiment.

DESCRIPTION OF EMBODIMENTS

Embodiments of a target tracking device, a target tracking method, and a recording medium storing a target tracking program according to the present disclosure will be described below with reference to the accompanying drawings.

RELATED ART

Figure 1:
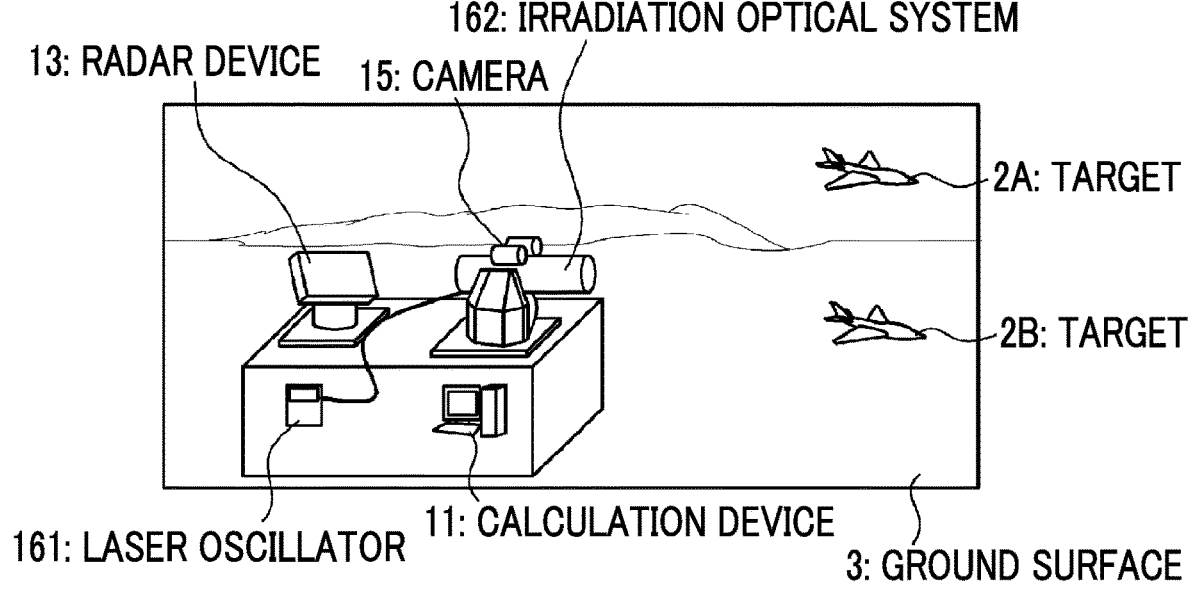
FIG. 1 is a diagram illustrating a configuration example of a target tracking device according to the related art.

First, a target tracking device 101 according to the related art will be described with reference to FIG. 1 for better understanding of the present disclosure. As illustrated in FIG. 1, the target tracking device 101 according to the related art includes a radar device 13, a calculation device 11, a camera 15, a laser oscillator 161, and an irradiation optical system 162. The radar device 13 detects flying targets 2A and 2B and outputs target position information indicating positions of the targets 2A and 2B. Hereinafter, in the case of not distinguishing the targets 2A and 2B from each other, the targets 2A and 2B will be collectively referred to as a target 2. The calculation device 11 images the target 2 by controlling the camera 15 based on the target position information and generates image information indicating a captured image. In addition, the calculation device 11 tracks the target 2 based on the target position information and on the image information. At this point, the calculation device 11 controls the camera 15 and the irradiation optical system 162 such that the camera 15 and the irradiation optical system 162 continue facing in a direction of the target 2. In addition, the calculation device 11 determines which part of the target 2 is to be irradiated with a laser beam based on the image information. Furthermore, the calculation device 11 performs a countermeasure against the target 2 by controlling the laser oscillator 161 to irradiate the target 2 with a laser beam generated by the laser oscillator 161 through the irradiation optical system 162.

Figure 2A:
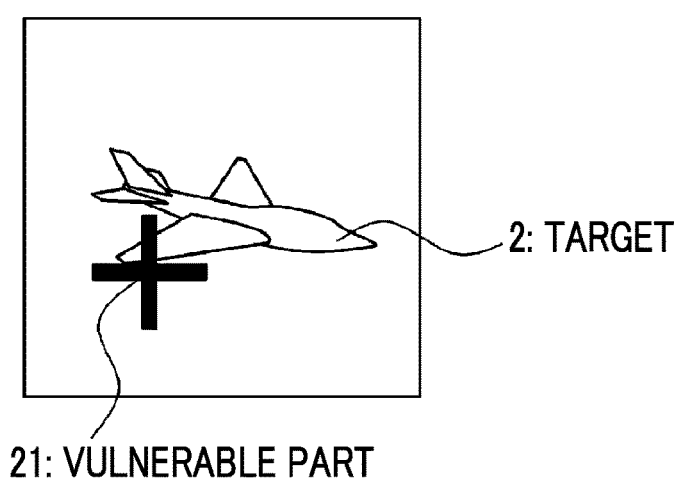
FIG. 2A is a diagram illustrating an example of an image in which a target is captured.

The calculation device 11 analyzes the image information in determining which part of the target 2 is to be irradiated with the laser beam. As illustrated in FIG. 2A, in a case where an image 151A of the target 2 has sufficient image quality with which a vulnerable part 21 of the target 2 can be identified using image recognition, the calculation device 11 operates in a mode of tracking the target 2 such that the vulnerable part 21 is focused on and is irradiated with the laser beam. Such a tracking mode will be referred to as a precision tracking mode. The vulnerable part 21 of the target 2 is a part for which a probability of efficiently neutralizing the target 2 by irradiating the part with the laser beam is estimated to be sufficiently high. For example, the vulnerable part 21 of the target 2 may be registered in advance in a database for each model of the target 2.

Figure 2B:
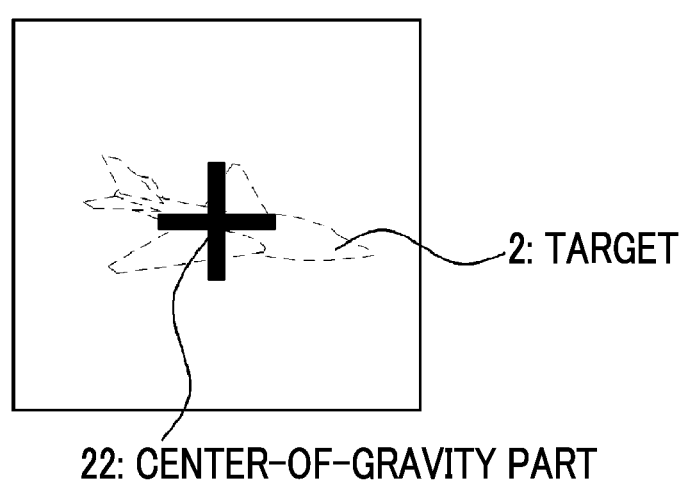
FIG. 2B is a diagram illustrating an example of the image in which the target is captured.

On the other hand, as illustrated in FIG. 2B, in a case where an image 151B of the target 2 does not have sufficient image quality with which the vulnerable part 21 of the target 2 can be identified using image recognition, the calculation device 11 operates in a mode of tracking the target 2 such that a center-of-gravity part 22 in which a center of gravity of the target 2 is estimated to be present is focused on and is irradiated with the laser beam. Such a tracking mode will be referred to as a rough tracking mode. The center-of-gravity part 22 of the target 2 may not necessarily match the actual center of gravity of the target 2. In addition, for example, the center-of-gravity part 22 of the target 2 may be calculated as a geometric center of pixels that are estimated to be included in the target 2 in the image 151B. In either case, the center-of-gravity part 22 of the target 2 is a part for which a probability of neutralizing the target 2 by irradiating the part with the laser beam is estimated to be sufficiently high.

Hereinafter, in the case of not distinguishing the images 151A and 151B of the target 2 from each other, the images 151A and 151B will be collectively referred to as an image 151. The image quality of the image 151 is affected by weather around the target 2, more specifically weather around a straight line (in a strict sense, a line segment) from the camera 15 to the target 2. This effect includes an effect, on focusing of light, of atmospheric turbulence occurring in atmosphere heated by a ground surface 3. In the atmosphere in which the atmospheric turbulence has occurred, a temperature, an air pressure, and a refractive index are not uniform, and a wavefront of light passing through the atmosphere may be disturbed. Accordingly, as in the case of the target 2B in FIG. 1, in a case where a distance from the ground surface 3 to the target 2 is relatively short, the image quality of the image 151 of the target 2 is likely to be relatively decreased. On the other hand, as in the case of the target 2A in FIG. 1, in a case where the distance from the ground surface 3 to the target 2 is relatively long, the image quality of the image 151 of the target 2 is likely to be relatively increased.

The calculation device 11 of the target tracking device 101 according to the related art performs image processing on the image 151 of the target 2, determines a level of the image quality of the image 151 using AI, selects the precision tracking mode in a case where the image quality of the image 151 is sufficiently high, and selects the rough tracking mode in a case where, on the other hand, the image quality of the image 151 is not sufficiently high. Then, in the precision tracking mode, the vulnerable part 21 of the target 2 is specified using image recognition, and the countermeasure is performed against the target 2 by focusing on the vulnerable part 21 and performing laser irradiation while tracking the target 2. In addition, in the rough tracking mode, the center-of-gravity part 22 of the target 2 is specified using image recognition, and the countermeasure is performed against the target 2 by focusing on the center-of-gravity part 22 and performing laser irradiation while tracking the target 2.

Here, the calculation device 11 has a relatively high computation cost and a relatively long processing time with respect to the processing of determining the level of the image quality of the image 151 for selecting the tracking mode.

First Embodiment

Therefore, in a target tracking device, a target tracking method, and a target tracking program according to one embodiment, which tracking mode is to be used to track the target 2 out of the precision tracking mode and the rough tracking mode is selected without using image recognition.

Figure 3:
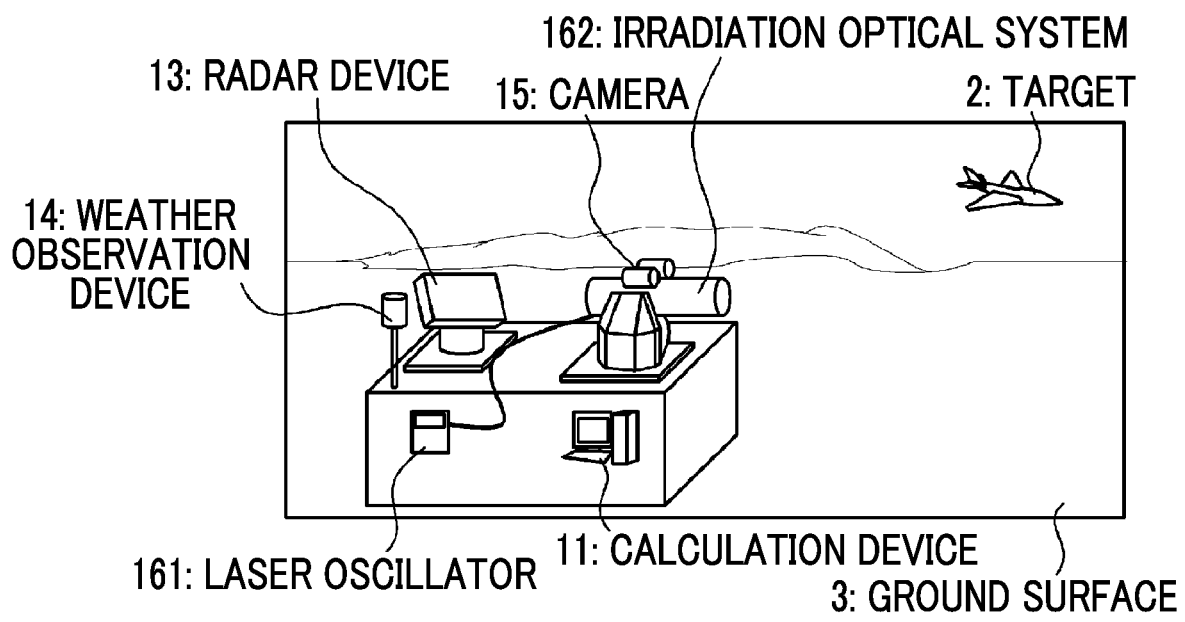
FIG. 3 is a diagram illustrating a configuration example of a target tracking device according to one embodiment.

As illustrated in FIG. 3, a target tracking device 1 according to one embodiment further includes a weather observation device 14, compared to the target tracking device 101 according to the related art illustrated in FIG. 1. In other words, the target tracking device 1 according to one embodiment includes the radar device 13, the weather observation device 14, the calculation device 11, the camera 15, the laser oscillator 161, and the irradiation optical system 162.

Figure 4:
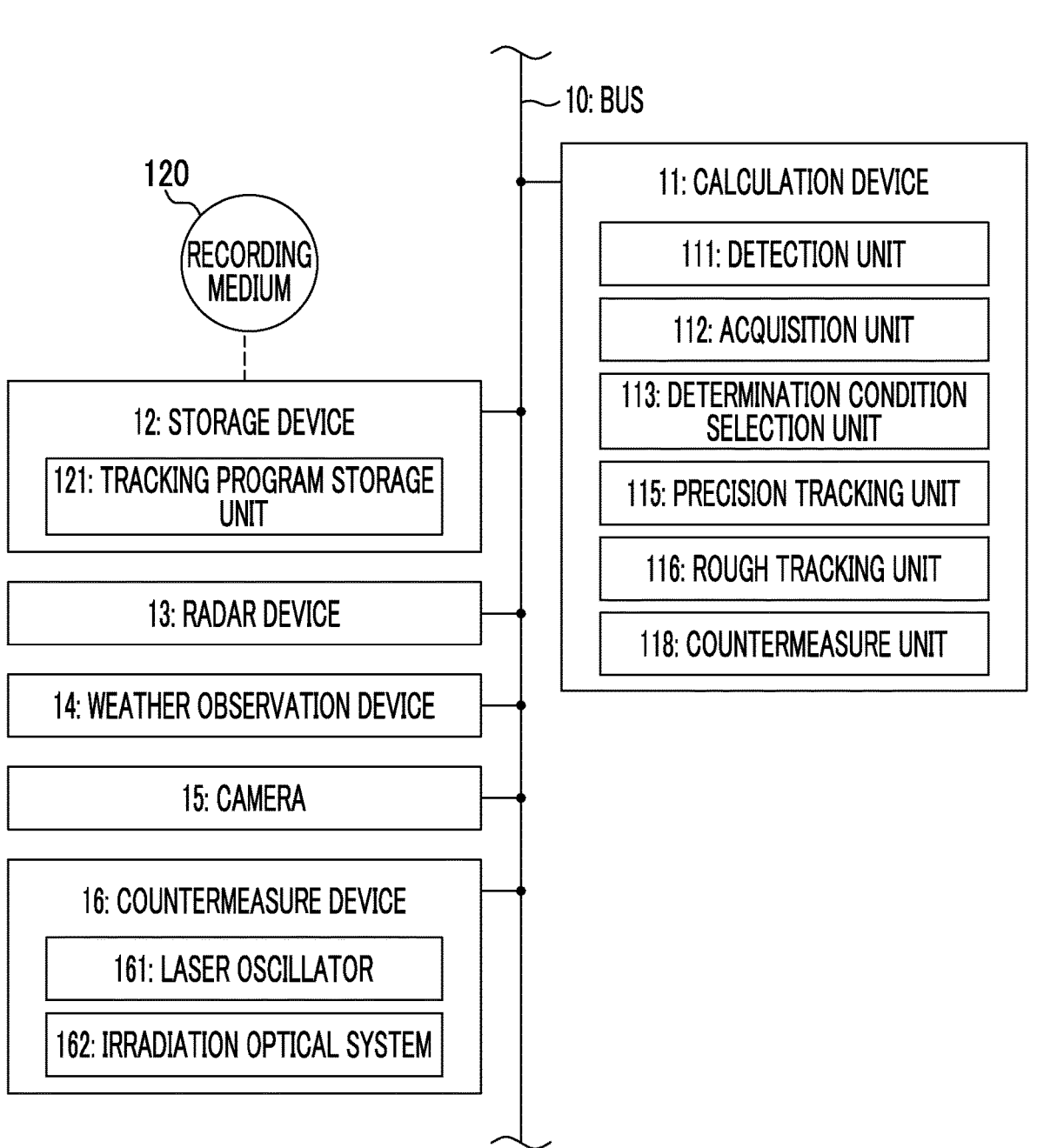
FIG. 4 is a block circuit diagram illustrating a configuration example of the target tracking device according to one embodiment.

More specifically, as illustrated in FIG. 4, the target tracking device 1 according to one embodiment includes a bus 10, the calculation device 11, a storage device 12, the radar device 13, the weather observation device 14, the camera 15, and a countermeasure device 16. The bus 10 connects the calculation device 11, the storage device 12, the radar device 13, the weather observation device 14, the camera 15, and the countermeasure device 16 to be capable of communicating with each other.

The calculation device 11 includes a detection unit 111, an acquisition unit 112, a determination condition selection unit (a determination condition selector) 113, a precision tracking unit (tracker) 115, a rough tracking unit (tracker) 116, and a countermeasure unit 118. The storage device 12 includes a tracking program storage unit 121. The tracking program storage unit 121 stores a tracking program. The calculation device 11 implements processing of each of the detection unit 111, the acquisition unit 112, the determination condition selection unit 113, the precision tracking unit 115, the rough tracking unit 116, and the countermeasure unit 118 by reading out the tracking program and executing the tracking program. In other words, each of the detection unit 111, the acquisition unit 112, the determination condition selection unit 113, the precision tracking unit 115, the rough tracking unit 116, and the countermeasure unit 118 is a virtual function block of processing implemented by cooperation between the calculation device 11 and the tracking program.

The tracking program may be read out from a recording medium 120 on an outside and be stored in the tracking program storage unit 121. The recording medium 120 may be non-transitory and tangible media. Alternatively, the tracking program may be received from the outside through a communication device, not illustrated, and be stored in the tracking program storage unit 121.

The detection unit 111 detects the flying target 2 by controlling the radar device 13 and outputs the target position information indicating the position of the target 2.

The acquisition unit 112 acquires various weather parameters indicating the weather around the target 2 by controlling the weather observation device 14. A refractive index structure constant $Cn^2$ indicating an intensity of the atmospheric turbulence can be estimated from a wind speed, an air temperature, humidity, and the like. Therefore, the weather observation device 14 includes, for example, a wind gauge that measures the wind speed, an air thermometer that measures the air temperature, and a hygrometer that measures the humidity.

The determination condition selection unit 113 selects the tracking mode for tracking the target 2 from a plurality of tracking modes based on a determination condition group for the position of the target 2 and the weather around the target 2.

The precision tracking unit 115 tracks the target 2 in the precision tracking mode by controlling the radar device 13 and the camera 15.

The rough tracking unit 116 tracks the target 2 in the rough tracking mode by controlling the radar device 13 and the camera 15.

The countermeasure unit 118 performs the countermeasure against the target 2 using the laser irradiation by controlling the countermeasure device 16. The countermeasure device 16 includes the laser oscillator 161 that generates the laser beam, and the irradiation optical system 162 that performs irradiation with the laser beam in a predetermined direction.

The target tracking method according to one embodiment will be described with reference to the flowchart in FIG. 5A and FIG. 5B. In other words, an operation example of the target tracking device 1 according to one embodiment will be described with reference to the flowchart in FIG. 5A and FIG. 5B.

In a case where the flowchart in FIG. 5A and FIG. 5B starts, step S03 is executed. In step S03, the determination condition selection unit 113 determines whether or not the target 2 is sufficiently separated from the ground surface 3. Specifically, the calculation device 11 implements the processing of the detection unit 111 by executing the target tracking program, and the detection unit 111 detects the position of the target 2 by controlling the radar device 13 and outputs the target position information indicating the position. In addition, the calculation device 11 executes the processing of the determination condition selection unit 113 by executing the target tracking program, and the determination condition selection unit 113 determines whether or not the target 2 is sufficiently separated from the ground surface 3 based on the target position information.

Here, the determination condition selection unit 113 determines that the target 2 is sufficiently separated from the ground surface 3 in a case where an altitude of the target 2 included in the target position information is greater than a predetermined threshold value. In a case where it is determined that the target 2 is sufficiently separated from the ground surface 3 (Yes), the processing transitions to step S05. On the other hand, in a case where the altitude of the target 2 is less than or equal to the threshold value and it is determined that the target 2 is not sufficiently separated from the ground surface 3 (No), the processing transitions to step S09.

In step S05, the determination condition selection unit 113 determines whether or not a straight line from the countermeasure device 16 to the target 2 is sufficiently separated from the ground surface 3. Specifically, the calculation device 11 implements the processing of the detection unit 111 by executing the target tracking program, and the detection unit 111 detects the position of the target 2 by controlling the radar device 13 and outputs the target position information indicating the position. In addition, the calculation device 11 executes the processing of the determination condition selection unit 113 by executing the target tracking program, and the determination condition selection unit 113 determines whether or not the straight line from the countermeasure device 16 to the target 2 is sufficiently separated from the ground surface 3 based on the target position information. At this point, the storage device 12 may store map information indicating a distribution of the altitude of the ground surface 3, and the determination condition selection unit 113 may calculate a distance between the ground surface 3 and each of a plurality of points included in the straight line from the countermeasure device 16 to the target 2 with reference to the map information.

Here, the determination condition selection unit 113, in the same manner as step S03, determines that the straight line is sufficiently separated from the ground surface 3 in a case where the distance between the ground surface 3 and each of the plurality of points included in the straight line from the countermeasure device 16 to the target 2 is greater than a predetermined threshold value. In a case where it is determined that the straight line is sufficiently separated from the ground surface 3 (Yes), the processing transitions to step S06. On the other hand, in a case where the distance between the straight line and the ground surface 3 is less than or equal to the threshold value and it is determined that the straight line is not sufficiently separated from the ground surface 3 (No), the processing transitions to step S09.

In step S06, the determination condition selection unit 113 determines whether or not an atmospheric state satisfies a condition. This condition includes, for example, a condition that the atmospheric turbulence has not occurred in the atmosphere around the target 2. Specifically, the calculation device 11 implements the processing of the acquisition unit 112 by executing the target tracking program, and the acquisition unit 112 acquires various weather parameters indicating the weather around the target 2 by controlling the weather observation device 14. The determination condition selection unit 113 calculates the refractive index structure constant $Cn^2$ based on the weather parameters and determines whether or not the refractive index structure constant $Cn^2$ is less than a predetermined threshold value. In a case where the refractive index structure constant $Cn^2$ is less than the predetermined threshold value, it is estimated that the atmospheric turbulence has not occurred, and thus, it is estimated that the image quality of the image 151 obtained by imaging the target 2 via the camera 15 is sufficiently high. Accordingly, it is estimated that the vulnerable part 21 of the target 2 can be specified from the image 151 using image recognition.

As described above, the determination condition selection unit 113 determines that the atmospheric condition is satisfied in a case where the refractive index structure constant $Cn^2$ in the atmosphere around the target 2 is less than the predetermined threshold value. In a case where it is determined that the atmospheric condition is satisfied (Yes), the processing transitions to step S08. On the other hand, in a case where the refractive index structure constant $Cn^2$ in the atmosphere around the target 2 is greater than or equal to the predetermined threshold value and the determination condition selection unit 113 determines that the atmospheric condition is not satisfied (No), the processing transitions to step S09.

As described above, in a case where the conditions are satisfied in the determination of all of steps S03, S05, and S06, the processing transitions to step, and precision tracking of the target 2 is performed. On the other hand, in a case where the conditions are not satisfied in the determination of at least one of step S03, step S05, or step S06, the processing transitions to step S09, and rough tracking of the target 2 is performed.

In step S08, the precision tracking unit 115 performs the precision tracking of the target 2. Specifically, the calculation device 11 implements the processing of the precision tracking unit 115 by executing the target tracking program. The precision tracking unit 115 images the target 2 by controlling the camera 15 with reference to the target position information output by the detection unit 111, detects the vulnerable part 21 of the target 2 from the image 151 of the target 2, and outputs precision tracking information for focusing on the vulnerable part 21 and performing the laser irradiation. After step S08, the processing transitions to step S11.

In step S09, the rough tracking unit 116 performs the rough tracking of the target 2. Specifically, the calculation device 11 implements the processing of the rough tracking unit 116 by executing the target tracking program. The rough tracking unit 116 images the target 2 by controlling the camera 15 with reference to the target position information output by the detection unit 111, detects the center-of-gravity part 22 of the target 2 from the image 151 of the target 2, and outputs rough tracking information for focusing on the center-of-gravity part 22 and performing the laser irradiation. After step S09, the processing transitions to step S11.

In step S11 in FIG. 5B, the countermeasure unit 118 performs the countermeasure against the target 2. Specifically, the calculation device 11 implements the processing of the countermeasure unit 118 by executing the target tracking program. The countermeasure unit 118 directs an optical axis of the irradiation optical system 162 to a focused part of the target 2 by controlling the irradiation optical system 162 of the countermeasure device 16. Here, the focused part of the target 2 is the vulnerable part 21 focused in step S08 or the center-of-gravity part 22 focused in step S09.

In this state, the countermeasure unit 118 performs the countermeasure against the target 2 using the laser irradiation by controlling the laser oscillator 161 to cause the laser beam generated by the laser oscillator 161 to enter the irradiation optical system 162. At this point, the laser irradiation to the target 2 may be started by an operation of an operator.

After step S11, step S12 is executed. In step S12, the countermeasure unit 118 determines whether or not the countermeasure against the target 2 is completed. Specifically, the calculation device 11 implements the processing of the countermeasure unit 118 by executing the target tracking program. The countermeasure unit 118 determines whether or not the target 2 is neutralized with reference to the target position information output by the detection unit 111 and/or the image 151 captured by the camera 15. In a case where it is determined that the target 2 is not neutralized, it is determined that the countermeasure against the target 2 is not completed. In a case where it is determined that the countermeasure against the target 2 is not completed (No), the processing returns to step S11. In other words, step S11 and step S12 are repeated until the countermeasure against the target 2 is completed. On the other hand, in a case where it is determined that the target 2 is neutralized, it is determined that the countermeasure against the target 2 is completed. In a case where it is determined that the countermeasure against the target 2 is completed (Yes), the processing of the target tracking method is finished. The processing of the target tracking method may return to step S03 after step S12 in order to perform the countermeasure against the subsequent target 2.

As described above, in the target tracking device 1, the target tracking method, and the target tracking program according to one embodiment, the tracking mode for tracking the target 2 is selected from the precision tracking mode and the rough tracking mode through conditional branching processing based on the determination condition for various parameters. Consequently, it is possible to significantly reduce the computation cost of the calculation device 11 and relatively increase a processing speed, compared to, for example, the case of the related art described with reference to FIG. 1. Accordingly, the target 2 can be efficiently tracked.

Second Embodiment

In the first embodiment described above, a case where the precision tracking mode and the rough tracking mode are provided as options of the tracking mode for tracking the target 2 has been described. In the present embodiment, a case where a further option is provided for the tracking mode will be described. For example, a case where a rainy weather precision tracking mode is provided as an option of the tracking mode in addition to the precision tracking mode and the rough tracking mode will be described. The rainy weather precision tracking mode is a tracking mode for focusing on the vulnerable part 21 of the target 2 and performing tracking and the countermeasure, which is suitable in a case where the weather around the target 2 is rainy under a condition in which the precision tracking mode is selected in the first embodiment. Here, the precision tracking mode is a tracking mode for focusing on the vulnerable part 21 of the target 2 and performing tracking and the countermeasure, which is suitable in a case where the weather around the target 2 is sunny or cloudy or an amount of rainfall is less than a predetermined threshold value.

As illustrated in FIG. 6, the target tracking device 1 according to one embodiment is obtained by adding a rainy weather precision tracking unit 117 to the calculation device 11 of the target tracking device 1 according to the first embodiment illustrated in FIG. 4. The calculation device 11 further implements processing of the rainy weather precision tracking unit 117 by reading out the tracking program and executing the tracking program. In other words, the rainy weather precision tracking unit 117 is a virtual function block of processing implemented by cooperation between the calculation device 11 and the tracking program.

The rainy weather precision tracking unit 117 tracks the target 2 in the rainy weather precision tracking mode by controlling the radar device 13 and the camera 15.

The target tracking method according to one embodiment will be described with reference to the flowchart in FIG. 7A and FIG. 7B. In other words, an operation example of the target tracking device 1 according to one embodiment will be described with reference to the flowchart in FIG. 7A and FIG. 7B.

Figure 7A:
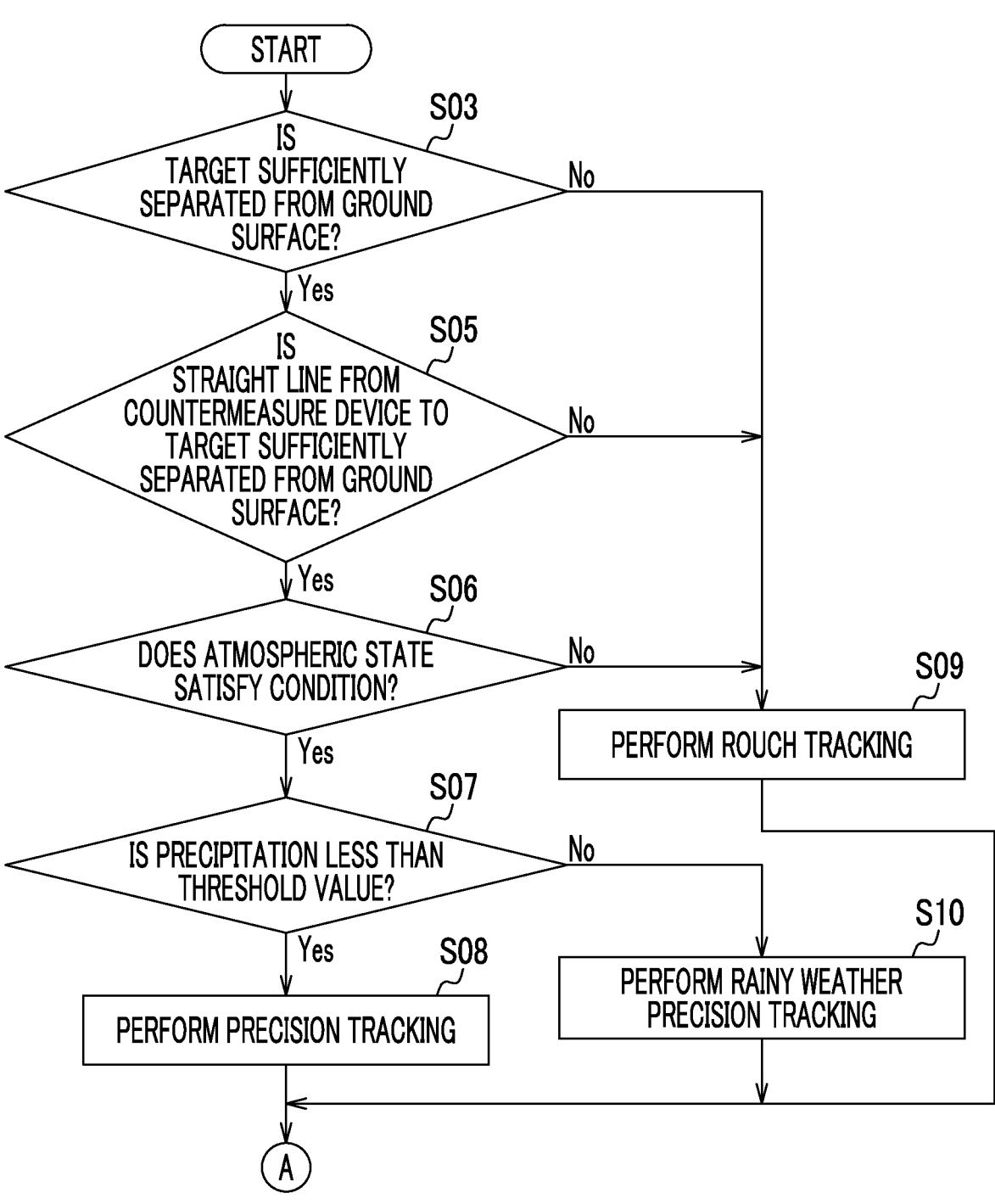
FIG. 7A is a part of a flowchart illustrating a configuration example of the target tracking method according to one embodiment.
Figure 7B:
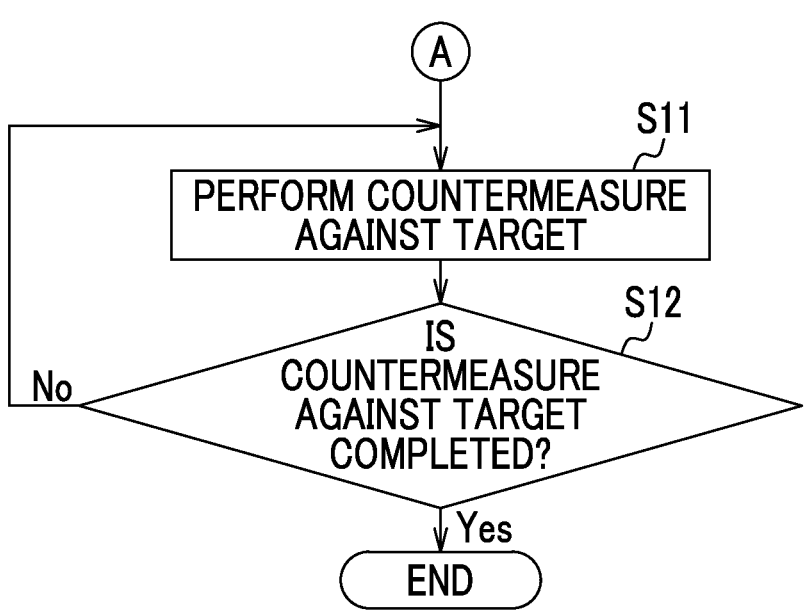
FIG. 7B is a part of the flowchart illustrating the configuration example of the target tracking method according to one embodiment.

The processing of the target tracking method according to one embodiment illustrated in FIG. 7A and FIG. 7B is obtained by adding the following changes to the processing of the target tracking method according to the first embodiment illustrated in FIG. 5A and FIG. 5B. That is, step S07 and step S10 are added. Here, in a case where a Yes determination is made in step S06, the processing transitions to step S07 in the present embodiment instead of transitioning to step S08 in the first embodiment.

In step S07, the determination condition selection unit 113 determines whether or not the amount of rainfall is less than a threshold value. Specifically, the calculation device 11 implements the processing of the acquisition unit 112 by executing the target tracking program, and the acquisition unit 112 acquires a weather parameter indicating the amount of rainfall around the target 2 by controlling the weather observation device 14. In a case where it is determined that the amount of rainfall is less than the predetermined threshold value (Yes), the processing transitions to step S08. On the other hand, in a case where it is determined that the amount of rainfall is greater than or equal to the threshold value (No), the processing transitions to step S10.

In step S10, the rainy weather precision tracking unit 117 performs rainy weather precision tracking of the target 2. Specifically, the calculation device 11 implements the processing of the rainy weather precision tracking unit 117 by executing the target tracking program. The rainy weather precision tracking unit 117 images the target 2 by controlling the camera 15 with reference to the target position information output by the detection unit 111, detects the vulnerable part 21 of the target 2 from the image 151 of the target 2 using an algorithm suitable for the rainy weather, and outputs the precision tracking information for focusing on the vulnerable part 21 and performing the laser irradiation. After step S10, the processing transitions to step S11.

As described above, in the target tracking device 1, the target tracking method, and the target tracking program according to one embodiment, the tracking mode for tracking the target 2 can be selected from the precision tracking mode, the rough tracking mode, and the rainy weather precision tracking mode. A plurality of tracking modes included in these options may include a further different tracking mode. In addition, even in the present embodiment, the conditional branching processing based on the determination condition for various parameters is performed in selecting the tracking mode in the same manner as that in the first embodiment. Thus, it is possible to significantly reduce the computation cost of the calculation device 11 and relatively increase the processing speed. Accordingly, the target 2 can be efficiently tracked.

Third Embodiment

In the first embodiment described above, in a case where the countermeasure against the target 2 using the laser irradiation starts in step S11, the same tracking mode is continuously used until the countermeasure is completed. In the present embodiment, the tracking mode is selected again from the options in a case where the altitude of the target 2 has changed during a period from the start of the countermeasure against the t target 2 using the laser irradiation in step S11 to the completion of the countermeasure.

The target tracking device 1 according to the present embodiment is the same as the target tracking device 1 according to the first embodiment illustrated in FIG. 4.

The target tracking method according to one embodiment will be described with reference to the flowchart in FIG. 8A and FIG. 8B. In other words, an operation example of the target tracking device 1 according to one embodiment will be described with reference to the flowchart in FIG. 8A and FIG. 8B.

Figure 8A:
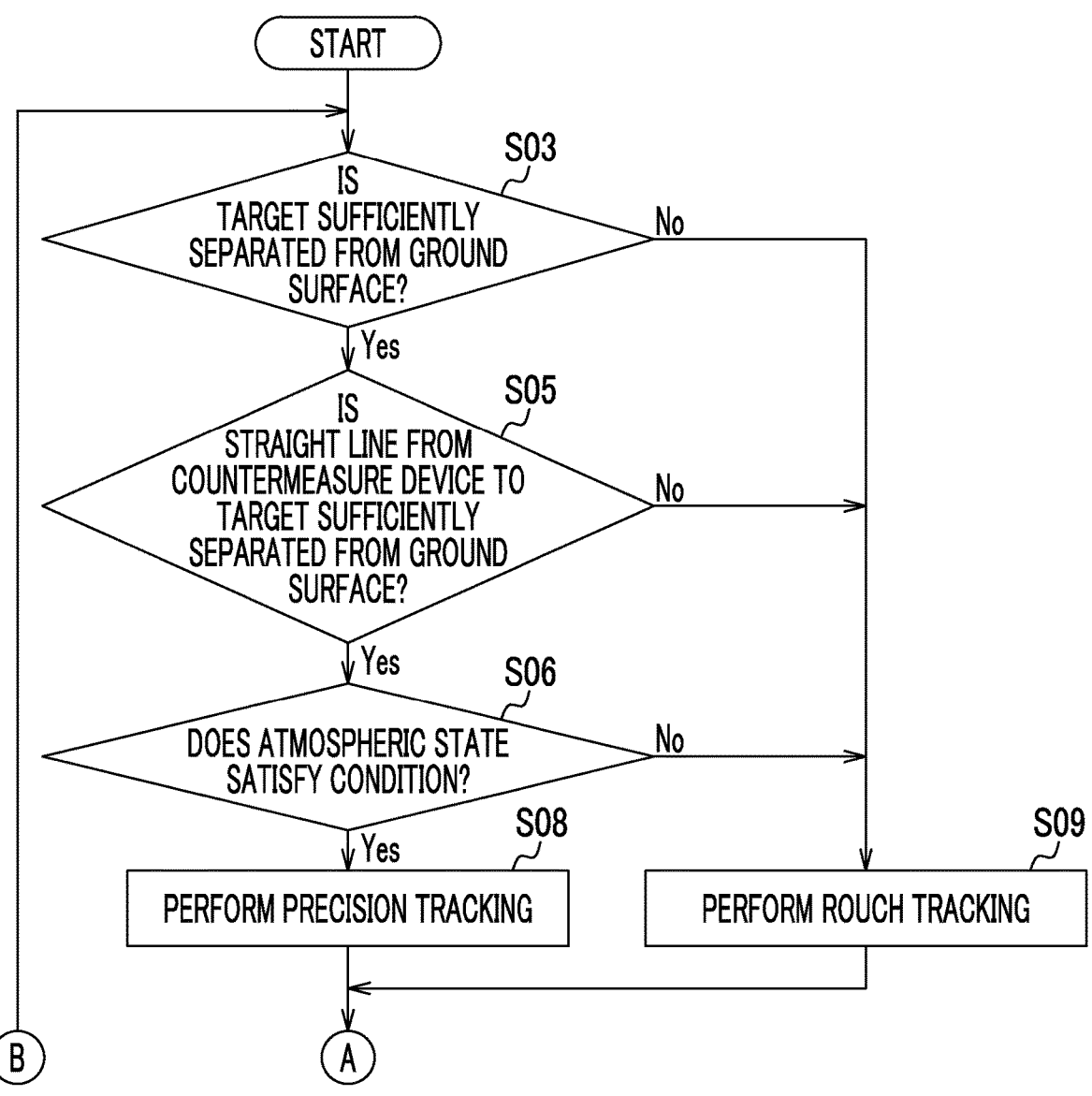
FIG. 8A is a part of a flowchart illustrating a configuration example of the target tracking method according to one embodiment.
Figure 8B:
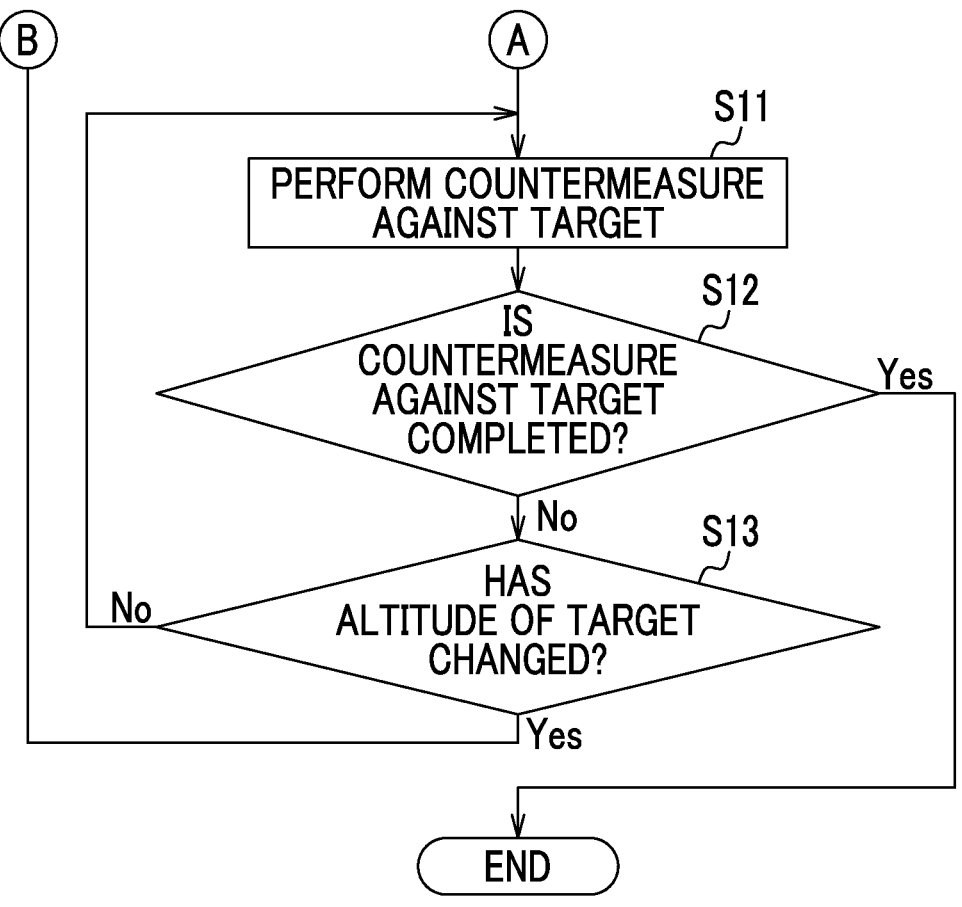
FIG. 8B is a part of the flowchart illustrating the configuration example of the target tracking method according to one embodiment.

The processing of the target tracking method according to one embodiment illustrated in FIG. 8A and FIG. 8B is obtained by adding the following changes to the processing of the target tracking method according to the first embodiment illustrated in FIG. 5A and FIG. 5B. That is, step S13 is added. Here, in a case where a No determination is made in step S12, the processing transitions to step S13 in the present embodiment instead of transitioning to step S11 in the first embodiment.

In step S13, the detection unit 111 determines whether or not the altitude of the target 2 has changed. Specifically, the calculation device 11 implements the processing of the detection unit 111 by executing the target tracking program. The detection unit 111 detects the altitude of the target 2 by controlling the radar device 13. The detection unit 111 determines that the altitude of the target 2 has changed in a case where a threshold value used for determining a first altitude in step S03 falls between the first altitude detected in step S03 and a second altitude detected in step S13. In a case where it is determined that the altitude of the target 2 has changed (Yes), the processing returns to step S03. On the other hand, in a case where the threshold value in step S03 does not fall between the first altitude and the second altitude and it is determined that the altitude of the target 2 has not changed (No), the processing returns to step S11.

As described above, in the target tracking device 1, the target tracking method, and the target tracking program according to one embodiment, the tracking mode can be selected again from the options in a case where the altitude of the target 2 has changed during the countermeasure against the target 2 using the laser irradiation. Accordingly, after the countermeasure against the target 2 has started, the tracking mode can be switched to a tracking mode suitable for the altitude in accordance with a change in the altitude of the target 2.

Fourth Embodiment

In the first embodiment described above, the tracking mode for tracking the target 2 is selected through the conditional branching processing based on the determination condition for various without parameters using the processing of determining the level of the image quality of the image 151 using AI according to the related art. Accordingly, the computation cost is significantly reduced, compared to that in the related art. However, determination accuracy of the processing of determining the level of the image quality may be higher than determination accuracy of the conditional branching processing. Therefore, in the present embodiment, the tracking mode is selected through the conditional branching processing at a certain time or through the processing of determining the level of the image quality of the image 151 using AI at a certain time. Accordingly, a certain high level of the determination accuracy is maintained while the computation cost is reduced to a certain level, compared to that in the related art. For example, in the present embodiment, a case where the tracking mode is selected four times through the conditional branching processing and once through the processing of determining the level of the image quality of the image 151 using AI in selecting the tracking mode five times will be described. However, the numbers of times are merely an example and do not limit the present embodiment.

As illustrated in FIG. 9, the target tracking device 1 according to one embodiment is obtained by adding an image quality condition selection unit 114 to the calculation device 11 of the target tracking device 1 according to the first embodiment illustrated in FIG. 4. The calculation device 11 further implements processing of the image quality condition selection unit 114 by reading out the tracking program and executing the tracking program. In other words, the image quality condition selection unit 114 is a virtual function block of processing implemented by cooperation between the calculation device 11 and the tracking program.

The image quality condition selection unit 114 performs image processing on the image 151 of the target 2, determines the level of the image quality of the image 151 using AI, selects the precision tracking mode in a case where the image quality of the image 151 is sufficiently high, and selects the rough tracking mode in a case where, on the other hand, the image quality of the image 151 is not sufficiently high.

The target tracking method according to one embodiment will be described with reference to the flowchart in FIG. 10A and FIG. 10B. In other words, an operation example of the target tracking device 1 according to one embodiment will be described with reference to the flowchart in FIG. 10A and FIG. 10B.

Figure 10A:
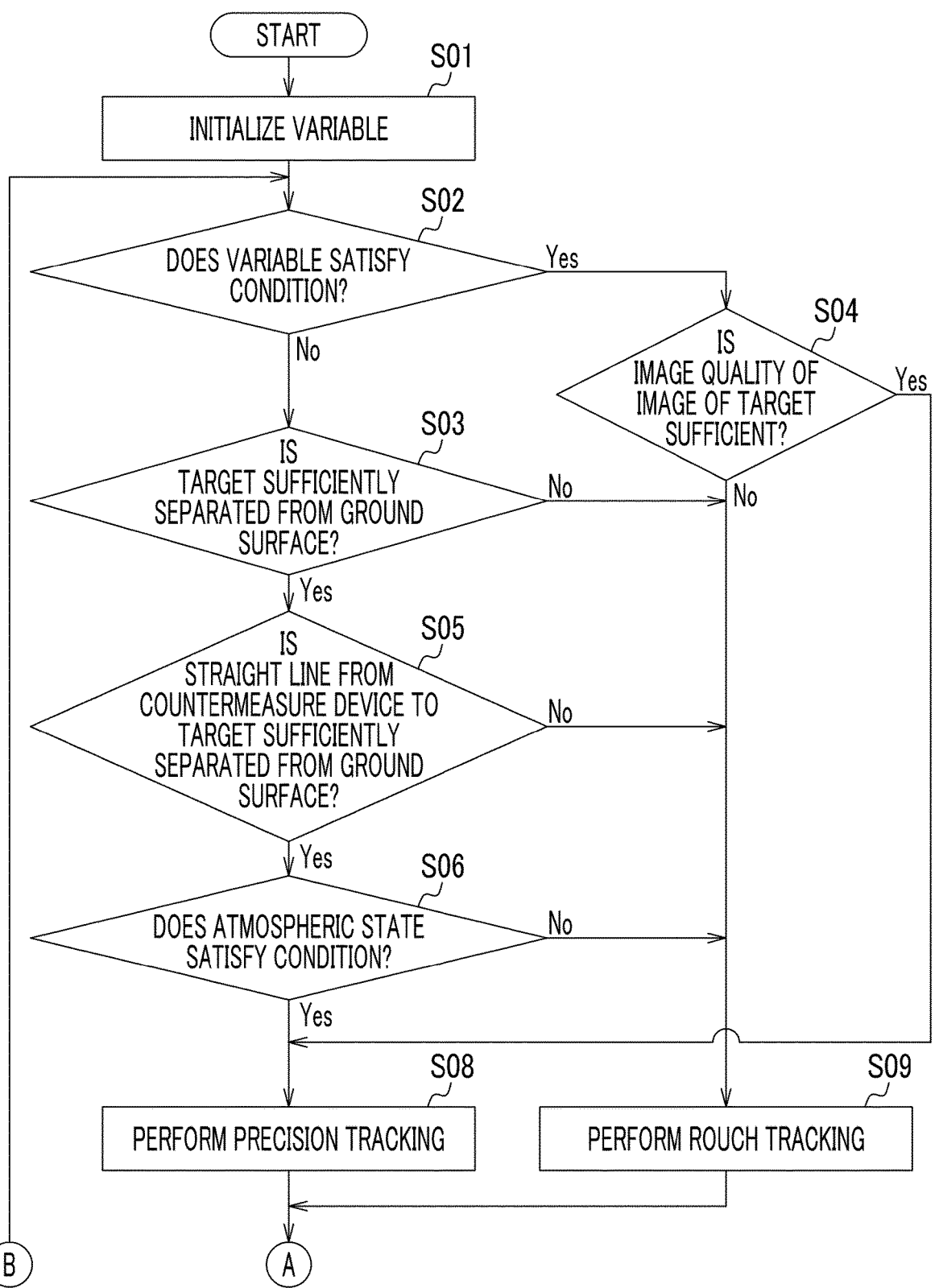
FIG. 10A is a part of a flowchart illustrating a configuration example of the target tracking t method according to one embodiment.
Figure 10B:
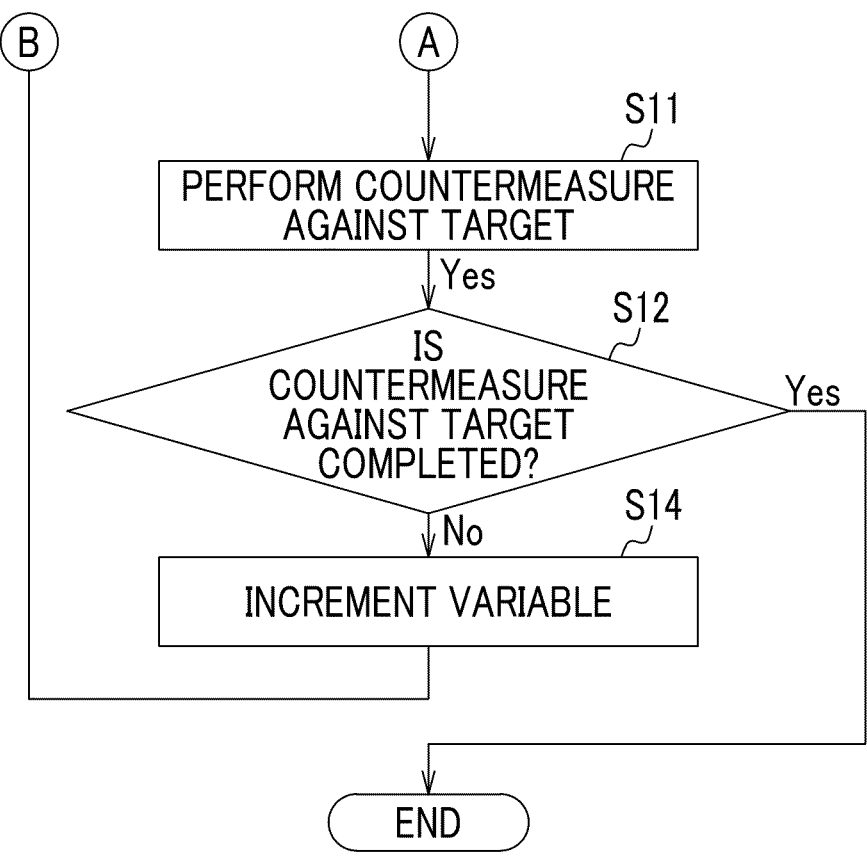
FIG. 10B is a part of the flowchart illustrating the configuration example of the target tracking method according to one embodiment.

The processing of the target tracking method according to one embodiment illustrated in FIG. 10A and FIG. 10B is obtained by adding the following changes to the processing of the target tracking method according to the first embodiment illustrated in FIG. 5A and FIG. 5B. That is, steps S01, S02, S04, and S14 are added. Here, while step S03 is executed in a case where the flowchart in FIG. 5A and FIG. 5B starts in the first embodiment, step S01 is executed instead in a case where the flowchart in FIG. 10A and FIG. 10B starts in the present embodiment.

In step S01, the detection unit 111 initializes a variable. Specifically, the calculation device 11 implements the processing of the detection unit 111 by executing the target tracking program. The variable is used for counting the number of times of selection of the tracking mode. For example, the detection unit 111 initializes the variable to "1".

After step S01, step S02 is executed. In step S02, the detection unit 111 determines whether or not the variable satisfies a condition. Specifically, the calculation device 11 implements the processing of the determination condition selection unit 113 by executing the target tracking program. For example, the determination condition selection unit 113 determines that the variable satisfies the condition in a case where the variable is a multiple of "5", and otherwise determines that the variable does not satisfy the condition. In the present embodiment, the determination condition is set such that a ratio of a plurality of types of processing for selecting the tracking mode is set to 4:1. However, this is merely an example and does not limit the present embodiment. In a case where it is determined that the variable satisfies the condition (Yes), the processing transitions to step S04. On the other hand, in a case where it is determined that the variable does not satisfy the condition (No), the processing transitions to step S03.

In step S04, the image quality condition selection unit 114 determines whether or not the image quality of the image 151 of the target 2 is sufficient. Specifically, the calculation device 11 implements the processing of the image quality condition selection unit 114 by executing the target tracking program. The image quality condition selection unit 114 performs image processing on the image 151 of the target 2 and determines the level of the image quality of the image 151 using AI. In a case where the image quality of the image 151 is sufficient for recognizing the vulnerable part 21 of the target 2 using image processing, the image quality condition selection unit 114 determines that the image quality of the image 151 of the target 2 is sufficient. In a case where it is determined that the image quality of the image 151 of the target 2 is sufficient (Yes), the processing transitions to step S08. On the other hand, in a case where it is determined that the image quality of the image 151 is not sufficient for recognizing the vulnerable part 21 of the target 2 using image processing (No), the processing transitions to step S09.

In the first embodiment, the processing returns to step S11 in a case where a No determination is made in step S12 of the flowchart in FIG. 5A and FIG. 5B. However, in the present embodiment, the processing transitions to step S14 in a case where a No determination is made in step S12 of the flowchart in FIG. 10A and FIG. 10B.

In step S14, the detection unit 111 increments the variable. Specifically, the calculation device 11 implements the processing of the detection unit 111 by executing the target tracking program. The detection unit 111 increases a value of the variable to be used for counting the number of times of selection of the tracking mode by "1". After step S14, the processing returns to step S02.

As described above, in the target tracking device 1, the target tracking method, and the target tracking program according to one embodiment, processing having a relatively low computation cost and having relatively low determination accuracy and processing having relatively high determination accuracy and having a relatively high computation cost are used in combination with each other at a predetermined ratio as the processing of selecting the tracking mode for tracking the target 2. Accordingly, it is possible to reduce the computation cost to a certain level and maintain a certain high level of the determination accuracy.

Modification Example

In each embodiment, a configuration of obtaining the distance from the ground surface 3 to the target 2, that is, the altitude of the target 2, based on the position of the target 2 detected by controlling the radar device 13 via the detection unit 111 in step S03 of the flowchart in FIG. 5A, step S13 in FIG. 8B, and the like has been described. As a modification example of the configuration, the detection unit 111 may image the target 2 by controlling the camera 15 and obtain the distance from the ground surface 3 to the target 2 based on an angle of depression of the camera 15 at the time.

In each embodiment, a configuration of including a determination condition group related to the position of the target 2 and a determination condition group related to the atmospheric state around the target 2 in the determination condition group for selecting the precision tracking mode or the rough tracking mode has been described. As a modification example of the configuration, the determination condition group related to the atmospheric state around the target 2 may be omitted from the determination condition group for selecting the precision tracking mode or the rough tracking mode. In this case, in the flowchart in FIG. 5A, step S06 is deleted, and the processing transitions to step S08 in a case where the determination of step S05 results in "Yes". Similarly, in each of the flowcharts in FIG. 7A, FIG. 8A, and FIG. 10A, step S06 is deleted, and the processing transitions to step S08 in a case where the determination of step S05 results in "Yes".

In the third embodiment, a configuration of selecting the tracking mode again in a case where the altitude of the target 2 has changed after the start of the countermeasure against the target 2 and continuing or resuming the countermeasure against the target 2 has been described. As a modification example of the configuration, the tracking mode may be selected again in a case where a predetermined time has elapsed from the start of the countermeasure against the target 2, and the countermeasure against the target 2 may continue or resume. In this case, content of the determination performed in step S13 of the flowchart in FIG. 8B may be replaced with, for example, "Has the predetermined time elapsed from the start of the countermeasure against the target 2?".

While the invention conceived by the inventors has been specifically described above based on the embodiments, the present invention is not limited to the embodiments and, of course, can be subjected to various changes without departing from the gist of the present invention. In addition, a combination of each feature described in the embodiments that does not result in technical contradiction can be freely adopted.

For example, the second embodiment and the third embodiment can be combined with each other. That is, compared to the first embodiment, the rainy weather precision tracking unit 117 and steps S07 and S10 added in the second embodiment and step S13 added in the third embodiment may be added to the first embodiment at the same time. Similarly, the second embodiment and the fourth embodiment may be combined with each other, the third embodiment and the fourth embodiment may be combined with each other, and the second embodiment, the third embodiment, and the fourth embodiment may be combined with each other.

For example, the target tracking device 1, the target tracking method, and the recording medium storing the target tracking program according to each embodiment are perceived as follows.

(1) The target tracking device 1 according to a first aspect includes the determination condition selection unit 113 and the tracking units 115 and 116. The determination condition selection unit 113 selects the tracking mode for tracking the detected target 2 from the plurality of tracking modes based on the determination condition group for the position of the target 2. The tracking units 115 and 116 track the target 2 in the selected tracking mode. The plurality of tracking modes include a first tracking mode for focusing on the vulnerable part 21 of the target 2 and a second tracking mode for focusing on the center-of-gravity part 22 of the target 2. The target tracking device 1 further includes the countermeasure device 16 that performs the countermeasure by irradiating the focused parts 21 and 22 of the target 2 with the laser beam.

The target tracking device 1 according to the first embodiment achieves an effect of being able to efficiently track the target 2 by selecting the tracking mode from a plurality of options through processing having a relatively low computation cost.

(2) The target tracking device 1 according to a second aspect is the target tracking device 1 according to the first aspect, in which the determination condition selection unit 113 selects the first tracking mode in a case where a first determination condition group is satisfied. The first determination condition group includes a first condition and a second condition. The first condition is satisfied in a case where the distance between the target 2 and the ground surface 3 is estimated to be greater than a first threshold value. The second condition is satisfied in a case where the distance between the ground surface 3 and the straight line from the countermeasure device 16 to the target 2 is estimated to be greater than a second threshold value. The determination condition selection unit 113 selects the second tracking mode in a case where at least one of the first condition or the second condition is not satisfied.

The target tracking device 1 according to the second aspect achieves an effect of being able to efficiently track the target 2 by selecting the tracking mode through processing of comparing each of various parameters related to the altitude of the target 2 and to an altitude of the laser beam with which the target 2 is irradiated from the countermeasure device 16, with a corresponding threshold value.

(3) The target tracking device 1 according to a third aspect is the target tracking device 1 according to the second aspect, in which the first determination condition group further includes a third condition. The third condition is satisfied in a case where the refractive index structure constant $Cn^2$ around the target 2 is estimated to be less than a third threshold value. The determination condition selection unit 113 selects the second tracking mode in a case where the third condition is not satisfied.

The target tracking device 1 according to the third aspect achieves an effect of being able to efficiently track the target 2 by selecting the tracking mode further using processing of comparing a parameter related to the atmospheric turbulence in the atmosphere around the target 2 with a corresponding threshold value.

(4) The target tracking device 1 according to a fourth aspect is the target tracking device 1 according to the first aspect, in which the plurality of tracking modes further include a third tracking mode for focusing on the vulnerable part 21 of the target 2 in the rainy weather. The determination condition selection unit 113 selects the third tracking mode in a case where a second determination condition group is satisfied. The second determination condition group includes the first condition, the second condition, and the third condition. The first condition is satisfied in a case where the distance between the target 2 and the ground surface 3 is estimated to be greater than the first threshold value. The second condition is satisfied in a case where the distance between the ground surface 3 and the straight line from the countermeasure device 16 to the target 2 is estimated to be greater than the second threshold value. The third condition is satisfied in a case where the amount of rainfall around the target 2 is greater than the third threshold value. The determination condition selection unit 113 selects the first tracking mode in a case where the first condition and the second condition are satisfied and the third condition is not satisfied. The determination condition selection unit 113 selects the second tracking mode in a case where at least one of the first condition or the second condition is not satisfied.

The target tracking device 1 according to the fourth aspect achieves an effect of being able to efficiently track the target 2 by selecting the tracking mode from options further including the rainy weather precision tracking mode suitable for the rainy weather in addition to the precision tracking mode and the rough tracking mode.

(5) The target tracking device 1 according to a fifth aspect is the target tracking device 1 according to the fourth aspect, in which the second determination condition group further includes a fourth condition. The fourth condition is satisfied in a case where the refractive index structure constant $Cn^2$ around the target 2 is estimated to be less than a fourth threshold value. The determination condition selection unit 113 selects the first tracking mode in a case where the first condition, the second condition, and the fourth condition are satisfied and the third condition is not satisfied. The determination condition selection unit 113 selects the second tracking mode in a case where at least one of the first condition, the second condition, or the fourth condition is not satisfied.

The target tracking device 1 according to the fifth aspect achieves an effect of being able to efficiently track the target 2 by selecting the tracking mode further using processing of comparing the parameter related to the atmospheric turbulence in the atmosphere around the target 2 with the corresponding threshold value in a case where the rainy weather precision tracking mode is included in the options of the tracking mode.

(6) The target tracking device 1 according to a sixth aspect is the target tracking device 1 according to the first to fifth aspects, in which the determination condition selection unit 113 selects the tracking mode again in a case where the altitude of the target 2 has changed during the countermeasure against the target 2 by the countermeasure device 16.

The target tracking device 1 according to the sixth aspect achieves an effect of being able to efficiently track the target 2 by switching the tracking mode to a tracking mode suitable for the altitude in accordance with a change in the altitude of the target 2 after the start of the countermeasure against the target 2.

(7) The target tracking device 1 according to a seventh aspect is the target tracking device 1 according to the first to sixth aspects, further including the image quality condition selection unit 114. The image quality condition selection unit 114 selects the tracking mode from the plurality of tracking modes based on the image quality of the image 151 in which the target 2 is captured. The determination condition selection unit 113 switches between a first selection mode for selecting the tracking mode via the determination condition selection unit 113 and a second selection mode for selecting the tracking mode via the image quality condition selection unit 114 in accordance with the number of times of selection of the tracking mode.

The target tracking device 1 according to the seventh aspect achieves an effect of being able to maintain a certain high level of the determination accuracy while reducing the computation cost to a certain level by using the processing having a relatively low computation cost and having relatively low determination accuracy and the processing having relatively high determination accuracy and having a relatively high computation cost in combination with each other at the predetermined ratio.

(8) The target tracking device 1 according to an eighth aspect is the target tracking device 1 according to the seventh aspect, in which the image quality condition selection unit 114 selects the first tracking mode in a case where the image quality is sufficient for recognizing the vulnerable part 21 of the target 2 using image processing and selects the second tracking mode in a case where the image quality is not sufficient for recognizing the vulnerable part 21 of the target 2 using image processing.

The target tracking device 1 according to the eighth aspect achieves an effect of being able to select the tracking mode with higher accuracy than that in the case of indirectly estimating the image quality by directly determining the image quality of the image 151 of the target 2.

(9) The target tracking method according to a ninth aspect includes selecting the tracking mode for tracking the detected target 2 from the plurality of tracking modes based on the determination condition group for the position of the target 2, and tracking the target 2 in the selected tracking mode. The plurality of tracking modes include the first tracking mode for focusing on the vulnerable part 21 of the target 2 and the second tracking mode for focusing on the center-of-gravity part 22 of the target 2. The target tracking method further includes performing the countermeasure by irradiating the focused parts 21 and 22 of the target 2 with the laser beam.

The target tracking method according to the ninth embodiment achieves an effect of being able to efficiently track the target 2 by selecting the tracking mode from the plurality of options through processing having a relatively low computation cost.

(10) The recording medium storing the target tracking program according to a tenth aspect stores the target tracking program that is executed by the calculation device 11 to implement predetermined processing. The processing includes selecting the tracking mode for tracking the detected target 2 from the plurality of tracking modes based on the determination condition group for the position of the target 2, and tracking the target 2 in the selected tracking mode. The plurality of tracking modes include the first tracking mode for focusing on the vulnerable part 21 of the target 2 and the second tracking mode for focusing on the center-of-gravity part 22 of the target 2. The processing further includes performing the countermeasure by irradiating the focused parts 21 and 22 of the target 2 with the laser beam.

The target tracking program stored in the recording medium according to the tenth embodiment achieves an effect of being able to efficiently track the target 2 by selecting the tracking mode from the plurality of options through processing having a relatively low computation cost.

This application claims the benefit of priority based on Japanese Patent Application No. 2021-168758 filed on Oct. 14, 2021, the entire disclosure of which is incorporated herein by reference.

The invention claimed is:

1. A target tracking device comprising:
a determination condition selector that selects a tracking mode for tracking a detected target from a plurality of tracking modes based on a determination condition group for determining based on a position of the target; and
a tracker that tracks the target in the selected tracking mode,
wherein the plurality of tracking modes include a first tracking mode for focusing on a vulnerable part of the target and a second tracking mode for focusing on a center-of-gravity part of the target,
the target tracking device further includes a countermeasure device that performs a countermeasure by irradiating a focused part of the target with a laser beam,
the determination condition selector selects the first tracking mode in a case where a first determination condition group is satisfied,
the first determination condition group includes
a first condition that is satisfied in a case where a distance between the target and a ground surface is estimated to be greater than a first threshold value, and
a second condition that is satisfied in a case where a distance between the ground surface and a straight line from the countermeasure device to the target is estimated to be greater than a second threshold value, and
the determination condition selector selects the second tracking mode in a case where at least one of the first condition or the second condition is not satisfied.

2. The target tracking device according to claim 1, wherein the first determination condition group further includes a third condition that is satisfied in a case where a refractive index structure constant around the target is estimated to be less than a third threshold value, and
the determination condition selector selects the second tracking mode in a case where the third condition is not satisfied.

3. The target tracking device according to claim 1, wherein the determination condition selector selects the tracking mode again in a case where an altitude of the target has changed during the countermeasure against the target by the countermeasure device.

4. The target tracking device according to claim 1, further comprising:
an image quality condition selector that selects the tracking mode from the plurality of tracking modes based on image quality of an image in which the target is captured,
wherein the determination condition selector switches between a first selection mode for selecting the tracking mode via the determination condition selector and a second selection mode for selecting the tracking mode via the image quality condition selector in accordance with the number of times of selection of the tracking mode.

5. The target tracking device according to claim 4, wherein the image quality condition selector
selects the first tracking mode in a case where the image quality is sufficient for recognizing the vulnerable part of the target using image processing, and
selects the second tracking mode in a case where the image quality is not sufficient for recognizing the vulnerable part of the target using image processing.

6. A target tracking device comprising:
a determination condition selector that selects a tracking mode for tracking a detected target from a plurality of tracking modes based on a determination condition group for determining based on a position of the target; and
a tracker that tracks the target in the selected tracking mode,
wherein the plurality of tracking modes include a first tracking mode for focusing on a vulnerable part of the target and a second tracking mode for focusing on a center-of-gravity part of the target,
the target tracking device further includes a countermeasure device that performs a countermeasure by irradiating a focused part of the target with a laser beam,
the plurality of tracking modes further include a third tracking mode for focusing on the vulnerable part of the target in rainy weather,
the determination condition selector selects the third tracking mode in a case where a second determination condition group is satisfied,
the second determination condition group includes
a first condition that is satisfied in a case where a distance between the target and a ground surface is estimated to be greater than a first threshold value,
a second condition that is satisfied in a case where a distance between the ground surface and a straight line from the countermeasure device to the target is estimated to be greater than a second threshold value, and
a third condition that is satisfied in a case where an amount of rainfall around the target is greater than a third threshold value,
the determination condition selector selects the first tracking mode in a case where the first condition and the second condition are satisfied and the third condition is not satisfied, and
the determination condition selector selects the second tracking mode in a case where at least one of the first condition or the second condition is not satisfied.

7. The target tracking device according to claim 6, wherein the second determination condition group further includes a fourth condition that is satisfied in a case where a refractive index structure constant around the target is estimated to be less than a fourth threshold value, the determination condition selector selects the first tracking mode in a case where the first condition, the second condition, and the fourth condition are satisfied and the third condition is not satisfied, and the determination condition selector selects the second tracking mode in a case where at least one of the first condition, the second condition, or the fourth condition is not satisfied.

8. A target tracking device comprising:

a determination condition selector that selects a tracking mode for tracking a detected target from a plurality of tracking modes based on a determination condition group for determining based on a position of the target; and a tracker that tracks the target in the selected tracking mode, wherein the plurality of tracking modes include a first tracking mode for focusing on a vulnerable part of the target and a second tracking mode for focusing on a center-of-gravity part of the target, the target tracking device further includes a countermeasure device that performs a countermeasure by irradiating a focused part of the target with a laser beam, the target tracking device further includes an image quality condition selector that selects the tracking mode from the plurality of tracking modes based on image quality of an image in which the target is captured, and the determination condition selector switches between a first selection mode for selecting the tracking mode via the determination condition selector and a second selection mode for selecting the tracking mode via the image quality condition selector in accordance with the number of times of selection of the tracking mode.

9. The target tracking device according to claim 8, wherein the image quality condition selector selects the first tracking mode in a case where the image quality is sufficient for recognizing the vulnerable part of the target using image processing, and selects the second tracking mode in a case where the image quality is not sufficient for recognizing the vulnerable part of the target using image processing.

10. A target tracking method comprising:

selecting a tracking mode for tracking a detected target from a plurality of tracking modes based on a determination condition group for determining based on a position of the target; and tracking the target in the selected tracking mode, wherein the plurality of tracking modes include a first tracking mode for focusing on a vulnerable part of the target and a second tracking mode for focusing on a center-of-gravity part of the target, the target tracking method further includes performing a countermeasure by irradiating a focused part of the target with a laser beam, the selecting of the tracking mode includes selecting the first tracking mode in a case where a first determination condition group is satisfied, the first determination condition group includes a first condition that is satisfied in a case where a distance between the target and a ground surface is estimated to be greater than a first threshold value, and a second condition that is satisfied in a case where a distance between the ground surface and a straight line from a countermeasure device to the target is estimated to be greater than a second threshold value, and the selecting of the tracking mode includes selecting the second tracking mode in a case where at least one of the first condition or the second condition is not satisfied.

11. A non-transitory tangible computer-readable storage medium storing a target tracking program that is executed by a calculation device to implement predetermined processing, the processing comprising:

selecting a tracking mode for tracking a detected target from a plurality of tracking modes based on a determination condition group for determining based on a position of the target; and tracking the target in the selected tracking mode, wherein the plurality of tracking modes include a first tracking mode for focusing on a vulnerable part of the target and a second tracking mode for focusing on a center-of-gravity part of the target, the processing further includes performing a countermeasure by irradiating a focused part of the target with a laser beam, the selecting of the tracking mode includes selecting the first tracking mode in a case where a first determination condition group is satisfied, the first determination condition group includes a first condition that is satisfied in a case where a distance between the target and a ground surface is estimated to be greater than a first threshold value, and a second condition that is satisfied in a case where a distance between the ground surface and a straight line from a countermeasure device to the target is estimated to be greater than a second threshold value, and the selecting of the tracking mode includes selecting the second tracking mode in a case where at least one of the first condition or the second condition is not satisfied.

12. A target tracking method comprising:

selecting a tracking mode for tracking a detected target from a plurality of tracking modes based on a determination condition group for determining based on a position of the target; and tracking the target in the selected tracking mode, wherein the plurality of tracking modes include a first tracking mode for focusing on a vulnerable part of the target and a second tracking mode for focusing on a center-of-gravity part of the target, the target tracking method further includes performing a countermeasure by irradiating a focused part of the target with a laser beam, the plurality of tracking modes further include a third tracking mode for focusing on the vulnerable part of the target in rainy weather, the selecting of the tracking mode includes selecting the third tracking mode in a case where a second determination condition group is satisfied, the second determination condition group includes a first condition that is satisfied in a case where a distance between the target and a ground surface is estimated to be greater than a first threshold value, a second condition that is satisfied in a case where a distance between the ground surface and a straight line from a countermeasure device to the target is estimated to be greater than a second threshold value, and a third condition that is satisfied in a case where an amount of rainfall around the target is greater than a third threshold value, the selecting of the tracking mode includes selecting the first tracking mode in a case where the first condition and the second condition are satisfied and the third condition is not satisfied, and the selecting of the tracking mode includes selecting the second tracking mode in a case where at least one of the first condition or the second condition is not satisfied.

13. A non-transitory tangible computer-readable storage medium storing a target tracking program that is executed by a calculation device to implement predetermined processing, the processing comprising:

selecting a tracking mode for tracking a detected target from a plurality of tracking modes based on a determination condition group for determining based on a position of the target; and tracking the target in the selected tracking mode, wherein the plurality of tracking modes include a first tracking mode for focusing on a vulnerable part of the target and a second tracking mode for focusing on a center-of-gravity part of the target, the processing further includes performing a countermeasure by irradiating a focused part of the target with a laser beam, the plurality of tracking modes further include a third tracking mode for focusing on the vulnerable part of the target in rainy weather, the selecting of the tracking mode includes selecting the third tracking mode in a case where a second determination condition group is satisfied, the second determination condition group includes a first condition that is satisfied in a case where a distance between the target and a ground surface is estimated to be greater than a first threshold value, a second condition that is satisfied in a case where a distance between the ground surface and a straight line from a countermeasure device to the target is estimated to be greater than a second threshold value, and a third condition that is satisfied in a case where an amount of rainfall around the target is greater than a third threshold value, the selecting of the tracking mode includes selecting the first tracking mode in a case where the first condition and the second condition are satisfied and the third condition is not satisfied, and the selecting of the tracking mode includes selecting the second tracking mode in a case where at least one of the first condition or the second condition is not satisfied.

14. A target tracking method comprising:

selecting a tracking mode for tracking a detected target from a plurality of tracking modes based on a determination condition group for determining based on a position of the target; and tracking the target in the selected tracking mode, wherein the plurality of tracking modes include a first tracking mode for focusing on a vulnerable part of the target and a second tracking mode for focusing on a center-of-gravity part of the target, the target tracking method further includes performing a countermeasure by irradiating a focused part of the target with a laser beam, the target tracking method further includes selecting the tracking mode from the plurality of tracking modes based on image quality of an image in which the target is captured, and the target tracking method further includes switching between a first selection mode for selecting the tracking mode based on the determination condition group for determining based on the position of the target and a second selection mode for selecting the tracking mode based on the image quality of the image in which the target is captured, in accordance with the number of times of selection of the tracking mode.

15. A non-transitory tangible computer-readable storage medium storing a target tracking program that is executed by a calculation device to implement predetermined processing, the processing comprising:

selecting a tracking mode for tracking a detected target from a plurality of tracking modes based on a determination condition group for determining based on a position of the target; and tracking the target in the selected tracking mode, wherein the plurality of tracking modes include a first tracking mode for focusing on a vulnerable part of the target and a second tracking mode for focusing on a center-of-gravity part of the target, the processing further includes performing a countermeasure by irradiating a focused part of the target with a laser beam, the processing further includes selecting the tracking mode from the plurality of tracking modes based on image quality of an image in which the target is captured, and the processing further includes switching between a first selection mode for selecting the tracking mode based on the determination condition group for determining based on the position of the target and a second selection mode for selecting the tracking mode based on the image quality of the image in which the target is captured, in accordance with the number of times of selection of the tracking mode.

* * * * *